(12) United States Patent
Balmin et al.

(10) Patent No.: US 9,697,274 B2
(45) Date of Patent: Jul. 4, 2017

(54) STRATIFIED SAMPLING USING ADAPTIVE PARALLEL DATA PROCESSING

(71) Applicant: International Business Machines Corporation, Armonk, NY (US)

(72) Inventors: Andrey Balmin, San Jose, CA (US); Vuk Ercegovac, Campbell, CA (US); Peter J. Haas, San Jose, CA (US); Liping Peng, Amherst, MA (US); John Sismanis, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 216 days.

(21) Appl. No.: 14/141,635

(22) Filed: Dec. 27, 2013

(65) Prior Publication Data

US 2015/0186493 A1    Jul. 2, 2015

(51) Int. Cl.
    *G06F 17/30*    (2006.01)
(52) U.S. Cl.
    CPC .... *G06F 17/30598* (2013.01); *G06F 17/3053* (2013.01); *G06F 17/30324* (2013.01); *G06F 17/30486* (2013.01); *G06F 17/30536* (2013.01); *G06F 17/30867* (2013.01)
(58) Field of Classification Search
    USPC ........ 707/602, 607, 609, 687, 705, 790, 813
    See application file for complete search history.

(56) References Cited

U.S. PATENT DOCUMENTS

| 7,536,403 | B2 | 5/2009 | Gemulla et al. |
| 7,987,177 | B2 | 7/2011 | Beyer et al. |
| 2004/0117358 | A1* | 6/2004 | von Kaenel ...... G06F 17/30241 |
| 2007/0128899 | A1* | 6/2007 | Mayer .................. G06F 9/4406 439/152 |
| 2010/0030793 | A1* | 2/2010 | Cooper ............. G06F 17/30339 707/602 |
| 2011/0029377 | A1 | 2/2011 | Chen et al. |
| 2012/0144185 | A1 | 6/2012 | Raykova et al. |
| 2012/0311581 | A1* | 12/2012 | Balmin ................ G06F 9/5066 718/100 |

(Continued)

OTHER PUBLICATIONS

Grover et al., "Extending Map-Reduce for Efficient Predicate-Based Sampling", Proceedings of the 2012 IEEE 28th International Conference on Data Engineering, pp. 486-497, DOI: 10.1109/ICDE.2012.104, © 2012 IEEE.

(Continued)

*Primary Examiner* — Sana Al Hashemi
(74) *Attorney, Agent, or Firm* — Robert J. Shatto

(57) ABSTRACT

Stratified sampling of a plurality of records is performed. A plurality of records are partitioned into a plurality of splits, wherein each split includes at least a portion of the plurality of records. The split of the plurality of splits is provided to a mapper. The mapper assigns at least a portion the records of the at least one split to a group based on a strata of the assigned records, and filters the records of the group based on a comparison of the weights of the records to a local threshold of the mapper. The mapper updates the local threshold of the mapper by communicating with a coordinator. The mapper shuffles the group to a reducer, where the reducer filters the records of the group based on the weights of the records. The reducer provides a stratified sampling of the plurality of records based on the group.

21 Claims, 5 Drawing Sheets

(56) References Cited

U.S. PATENT DOCUMENTS

2013/0197815 A1* 8/2013 Gardner ............. G06K 9/00543
702/27
2014/0337472 A1* 11/2014 Newton ................. H04L 67/32
709/217

OTHER PUBLICATIONS

"MapReduce", From Wikipedia, the free encyclopedia, 11 pages, this page was last modified on Jan. 5, 2016, printed on Jan. 7, 2016, <https://en.wikipedia.org/wiki/MapReduce>.
Balmin et al., "Stratified Sampling Using Adaptive Parallel Data Processing", U.S. Appl. No. 15/208,677, filed Jul. 13, 2016.
Newton et al., "Content Delivery Framework", U.S. Appl. No. 61/737,072, filed Dec. 13, 2012.

* cited by examiner

STRATIFIED SAMPLING USING ADAPTIVE PARALLEL DATA PROCESSING

BACKGROUND

The present invention relates generally to stratified sampling of large datasets, and more specifically to using adaptive parallel data processing techniques to perform stratified sampling of large datasets.

Enterprises are not only collecting increasing amounts of data, but are also maintaining large historical archives in the order of petabytes. Processing such data in order to derive useful information and interesting patterns from it is a challenging task, especially when there are time and resource constraints. The sheer volume of data is a major contributing factor to the difficulty of the challenge. Sampling has been established as an effective tool for reducing the size of the input data.

Generally, many advanced analytical tasks have time and resource constraints that can be satisfied only using sampling techniques. In particular, in massive datasets, there are groups, called strata, within an overall population with varying characteristics. It is often advantageous to sample each stratum independently. This improves the representativeness of the sample, reduces the sampling error, and provides approximate aggregates with much less variability than a random sample of the whole population.

SUMMARY

Embodiments of the present invention disclose a method, computer program product, and system for the stratified sampling of a plurality of records. A plurality of records are partitioned into a plurality of splits, wherein each split includes at least a portion of the plurality of records. The split of the plurality of splits is provided to a mapper. The mapper assigns at least a portion the records of the at least one split to a group based on a strata of the assigned records, and filters the records of the group based on a comparison of the weights of the records to a local threshold of the mapper. The mapper updates the local threshold of the mapper by communicating with a coordinator. The mapper shuffles the group to a reducer, where the reducer filters the records of the group based on the weights of the records. The reducer provides a stratified sampling of the plurality of records based on the group.

DETAILED DESCRIPTION

Figure 1:
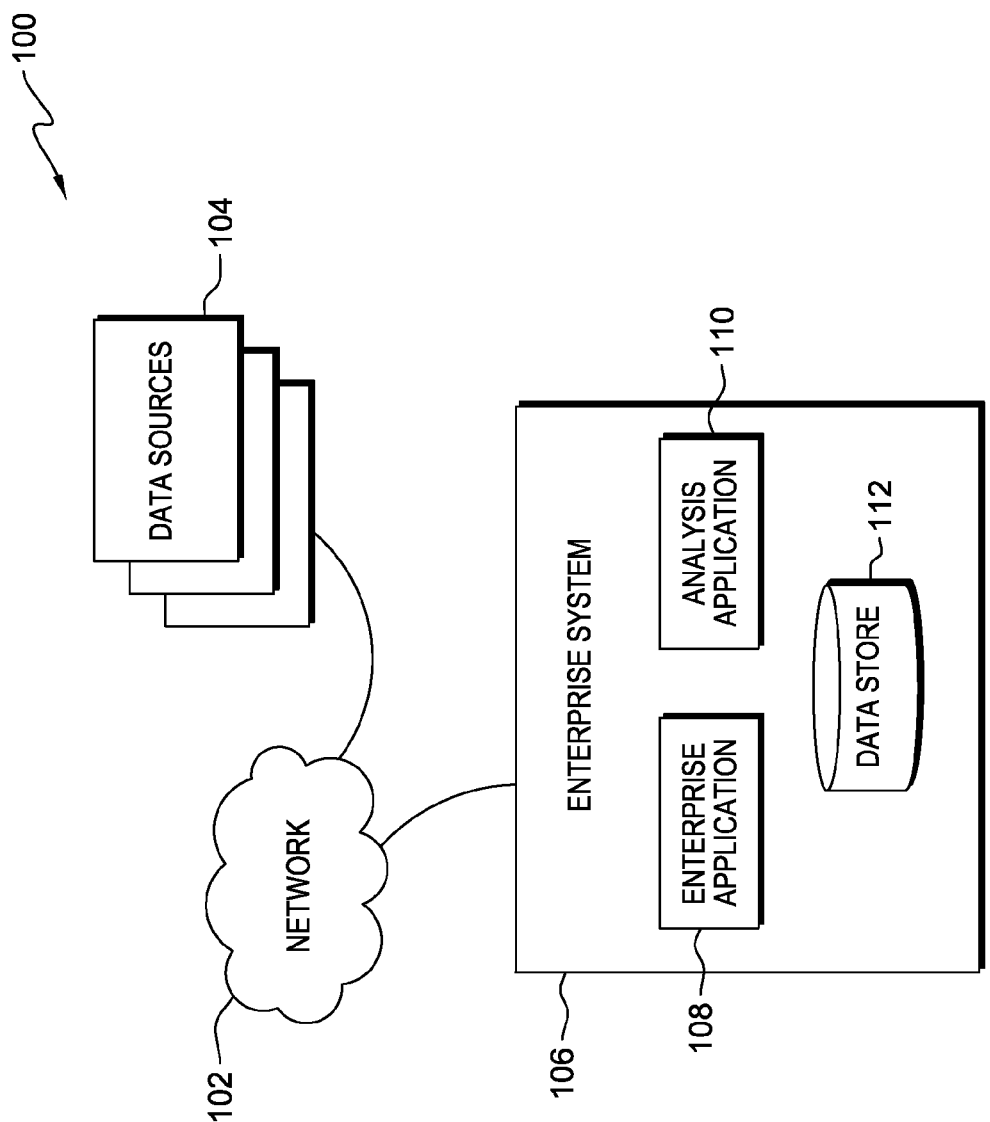
FIG. 1 is a block diagram of an enterprise data environment in accordance with an embodiment of the present invention.

The technique introduced herein addresses the problem of using a parallel data processing system, such as MapReduce, to perform stratified sampling on a massive dataset to produce a fixed-size uniform random sample for each stratum. Enterprises are increasingly using MapReduce-based infrastructures, such as Hadoop, for collecting, storing, and analyzing data. Hadoop can scale to hundreds or even thousands of nodes, and many petabytes of data. However, Hadoop alone does not provide the stratified sampling support of the technique introduced herein. Without using the technique introduced herein, a direct expression of a stratified sampling operation using ordinary MapReduce leads to excessive usage of memory, disk, processor, and network resources. Such excessive usage can significantly affect the performance of a shared cluster and can translate to unneeded expense when executed on a pay-as-you-go cloud computing infrastructure. To address these shortcomings, the technique introduced herein leverages Adaptive MapReduce, as described in R. Vernica, A. Balmin, K. S. Beyer, and V. Ercegovac, *Adaptive mapreduce using situation-aware mappers*, in *EDBT*, 2012, to provide a significant speed-up and a reduction of resource requirements. Of course, the technique introduced herein is not limited to utilization with Adaptive MapReduce, and can actually be used in a variety of systems that process massive datasets.

MapReduce is a parallel computation framework designed to scan and aggregate large data sets in a robust, flexible, and scalable manner. The framework processes jobs, which consist of map stages and reduce stages. The map stage scans the input data set, transforms each input record using a user-defined map function, and extracts a grouping key in parallel. The reduce stage shuffles mapper outputs and groups them according to the grouping key, aggregates each group using a user-defined reduce function, and writes out the result in parallel. Both the map and reduce stages consist of tasks that run independently. The tasks are run on a cluster of servers, each of which is divided into a fixed number of slots. Since tasks can be run independently and are idempotent, the MapReduce framework can make progress on a job as cluster slots become available, can load balance across heterogeneous environments, and can tolerate failures.

Adaptive MapReduce improves performance and simplifies job tuning over MapReduce by breaking one of its key assumptions that mappers work completely independently. The Adaptive MapReduce framework is careful to preserve the fault-tolerance, scalability, and programming API of MapReduce. In the Adaptive MapReduce framework, mappers exchange information with each other through an asynchronous communication channel implemented with a distributed meta-data store (DMDS), so that each mapper is aware of the global state of the job and can collaboratively make optimization decisions.

To illustrate the usage of the technique introduced herein, an example dataset including historical credit card transactions can be considered. Of course, this example is in no way limiting, and the technique introduced herein can be used on any dataset. The example dataset includes a record for each credit card transaction, the record including the bank that issued the card, the place and time of the transaction, the total amount, and a categorization of the merchant. Each record also has a fraud flag which can be set for transactions that were determined to be fraudulent. Sampling such an example dataset is an effective tool for performing an analysis (e.g., an analysis toward making a predictive model of which future transactions are also fraudulent, etc.), not only because there are resource and time constraints, but also because typical statistical tools simply cannot scale to the volume of unsampled credit card transaction data that modern enterprises collect.

Notably, analysis on a random sample of the entire example dataset is not effective, because there are typically many more valid transactions than fraudulent. As such, a random sample of the entire example dataset contains only a handful, or none, of the fraudulent transactions, and does not provide enough information for analysis. The analyst in this "needle-in-the-haystack" situation should instead work with a stratified sample, where each stratum, or group, is sampled independently. For example, the technique introduced herein can be utilized to sample the fraudulent transaction group independently of the valid transaction group.

According to the technique introduced herein, random weights are assigned to each record in a dataset (e.g., just prior to initiating mapper operation, etc.). The records having at least the k-smallest weights per group are distributively maintained by the operating mappers, where k is the required sample size of each stratum. For example, in the example dataset including historical credit card transactions, for k equal to 1000, at least 1000 fraudulent transaction records and at least 1000 non-fraudulent transaction records will be distributively maintained. This distributive maintenance can be accomplished by having each mapper estimate a global threshold per group for the weights at periodic intervals. Any record whose weight is greater than the estimated global threshold can be immediately discarded by the mapper processing it, because such records are guaranteed not to be in the final sampled result. By doing so, at least, and close to, k candidate records per group are kept in the aggregate memory of all of the mappers, such that only records from these candidates can be part of the final sampled result. Significantly, during the mapping operation, any given mapper maintains only a fraction of the k records per group.

After mapping operations are concluded and reducer operations begin, a small number of excess records may be shuffled to the reducers, even though the excess records will not be part of the final sample. The reducers filter these false-positive records by the time the job finishes, so that only the actual k records with the smallest weights per group are kept. For example, in the example dataset including historical credit card transactions, for k equal to 1000, perhaps 1001 fraudulent transaction records and 1100 non-fraudulent transaction records will be shifted to the reducers. The reducers will filter the false-positive records in excess of k, yielding 1000 fraudulent transaction records and 1000 non-fraudulent transaction records in the result.

Further according to the technique introduced herein, an alternative approach to computing a distributed sample includes sub-sampling local reservoir samples according to a Multivariate Hypergeometric Distribution (MHD). This approach works as a barrier, where every worker ($W_i$) sends to a coordinator its local number of records seen in a group ($N_i$) and number of sample candidates ($k_i$). The coordinator collects these inputs from all workers and randomly samples from MHD and sends back to each worker the exact number of samples ($m_i$) that it needs to keep. This approach guarantees that sum total of all $m_i$ will be exactly k. Thus, the worker will send to the reducer $m_i$ records with smallest weights and the reducer will receive exactly k records for this group, from all workers.

This approach typically cannot be done iteratively, and so instead it is used once, only at the end of the Map process, and only for groups that did not do any filtering yet. In other words, these groups never agreed on a threshold, most likely because they never started any communication rounds. Recall that a heuristic determines when a group should start its first communication round depending on the amount of memory available for buffering local sample candidates. Accordingly, the algorithm of this approach trades memory (used for buffering) for communication (used to agree on a global threshold). This MHD approach uses, potentially, a significant of memory, but reduced communication.

In this approach, workers start out buffering up to k samples for each group. For each group, as the workers see many records and/or as they start to run out of buffer space, they start performing a coordination protocol, as described herein. If, once the worker finishes processing data, some non-negligible fraction of groups never agreed on a global threshold, the MHD protocol is initiated, during which every worker sends $N_i$ and $k_i$ for each such group to a coordinator, and waits for an $m_i$ to be sent back. Once workers receive replies from the coordinator, they filter down each group i that participated in the MHD protocol to exactly $m_i$ records, which are sent to reducers.

This approach, involving MHD-based optimization, is particularly useful if there is a long tail of relatively small groups. These groups will not initiate coordination, because it is probably not very expensive to buffer them—they won't have k records on every worker, and coordinating each one of the individually will be very expensive—it will take too many communication messages. This approach can be implemented to run in bulk, for many groups simultaneously, making it cheaper, in terms of communication.

Further still according to the technique introduced herein, another alternative approach can be generalized to compute the answer to any "bottom-k" query that, per group of records, returns the k records with smallest values of some function f( ) computed over each input record. Such an approach can be modified to be made to compute "top-k" queries that return, per group, the k records with the largest values of f( ). For a given group, the global distribution of f( ) values is approximated by a histogram, and this histogram is used to estimate the global threshold. Specifically, each worker computes a local histogram for each group, such as a self-balancing histogram with a fixed number of buckets. This histogram will be over all f( ) values that the worker currently has for the group. If the worker already has a prior version of the global threshold, all these f( ) values will be below that threshold.

In this approach, if the local histogram bucket boundaries that the worker computed are ($b\_1, b\_2, \ldots b\_1$), the worker will asynchronously send to the coordinator a count for each of the buckets. The coordinator will order the counts in the increasing order of bucket boundaries $b\_i$ and will compute the total number of records with f( )<$b\_1$, f( )<$b\_2$, and so forth, and then pick the smallest $b\_i$ such that all workers combined have at least k records with f( )-values less than $b\_i$. This will be the new threshold t, that will be sent to all workers, so they can then purge all records with f( )>t.

In this approach, the computation that the coordinator does is the same as generally described herein. The only difference in this approach is that the workers compute the uniform buckets over all the values of f( ) instead of focusing the buckets on the expected value of the threshold. Generally herein, w values with a known distribution are generated, so the threshold can be estimated given the global record count N. For a "bottom-k" query, the distribution of f( ) values is not known, so a full histogram is computed.

Referring now to FIG. 1, a block diagram of enterprise data environment 100 in accordance with an embodiment of the present invention is shown. Enterprise data environment 100 includes network 102, data sources 104, and enterprise system 106. Network 102 can be, for example, a local area network (LAN), a wide area network (WAN) such as the Internet, or a combination of the two, and can include wired or wireless connections. In general, network 102 can be any combination of connections and protocols that will support communications via various channels between data sources 104 and enterprise system 106 in accordance with an embodiment of the invention. As will be discussed in detail below, enterprise system 106 includes analysis application 110, which performs a stratified sampling operation on data from data sources 104, in accordance with an embodiment of the present invention.

In various embodiments, each one of data sources 104, as well as enterprise system 106, can include a laptop, tablet, or netbook personal computer, a desktop computer, a personal digital assistant, a smart phone, a mainframe computer, or a networked server computer. Further, each one of data sources 104, as well as enterprise system 106, can include computing systems utilizing clustered computers and components to act as single pools of seamless resources when accessed through network 102, or can represent one or more cloud computing datacenters. In general, each one of data sources 104, as well as enterprise system 106, can be any programmable electronic device as described in further detail below with respect to FIG. 5.

Each of data sources 104 can be a source of any kind of data. For example, in accordance with the example given above, data sources 104 can include sources of credit card transaction data, such as retail merchant servers, etc. However, in various embodiments, data sources 104 can produce other kinds of data, such as web search data, seismic record data, automobile traffic data, or any other kind of data. Data sources 104 transmits data to enterprise system 106 via network 102.

Enterprise system 106 includes enterprise application 108, analysis application 110, and data store 112. Enterprise application 108 receives data from data sources 104 and stores it in data store 112. Further, enterprise application 108 can implement business rules or other functionality related to the operation of an enterprise controlling enterprise system 106. For example, a credit card company controlling enterprise system 106 can implement in enterprise application 108 a retail merchant interface between data source 104 and data store 112, as well as a set of finance business rules related to the operation of the credit card company. Such finance business rules can include rules for determining which credit card transaction records stored in data store 112 should be marked as fraudulent, for example. Additionally, enterprise application 108 can invoke analysis application 110 on data in data store 112, can identify strata within the data of data store 112 pertinent to the operation of analysis application 110, and can receive a sampled result from analysis application 110.

Analysis application 110, in one embodiment, can be invoked from enterprise application 108, can receive operational instructions from enterprise application 108, can receive identification of strata from enterprise application 108, can operate on data in data store 112, and can provide a sampled result to enterprise application 108. In one embodiment analysis application 110 includes an implementation of Adaptive MapReduce that has been configured to perform the technique introduced herein, and that is discussed in greater detail in the context of FIG. 2.

Generally, analysis application 110 samples each stratum of the data in data store 112 independently, to improve the representativeness of the sample, reduce the sampling error, and provide approximate aggregates with much less variability than a random sample of the whole dataset. Typically, the strata can be mutually exclusive, and every record in the dataset is assigned to exactly one stratum. Stratified sampling can be expressed as the set shown in following equation 1:

$$\cup_i \text{sample}(g_i, k_i) | g_i \subseteq R \wedge \cup_i(g_i) = R \wedge g_i \cap g_j = \varnothing \forall j \neq i \quad \text{Equation 1}$$

where R is the whole dataset, g corresponds to a stratum of R, and indices i, j iterate over all strata (i.e. the union of all strata is the whole dataset, and intersection of any two strata is empty). The sample($g_i$, $k_i$) function returns a fixed-size $k_i$ sample (set of records) of the stratum $g_i$. The total size of the stratified sample is $\Sigma_i k_i$. In various embodiments, the size $k_i$ can be different for each strata, but the embodiment discussed herein will use an equal sample size k for each stratum of the data in data store 112 for ease of exposition. During operation, analysis application 110 partitions data in data store 112 across the nodes of a cluster of enterprise system 106 and stores the data in a distributed file system of the cluster. Data is represented as (key, value) pairs, and the computation performed by analysis application 110 can be expressed by the two MapReduce functions map(k1,v1)→list(k2,v2) and reduce(k2, list(v2))→list (k3,v3).

Figure 2:
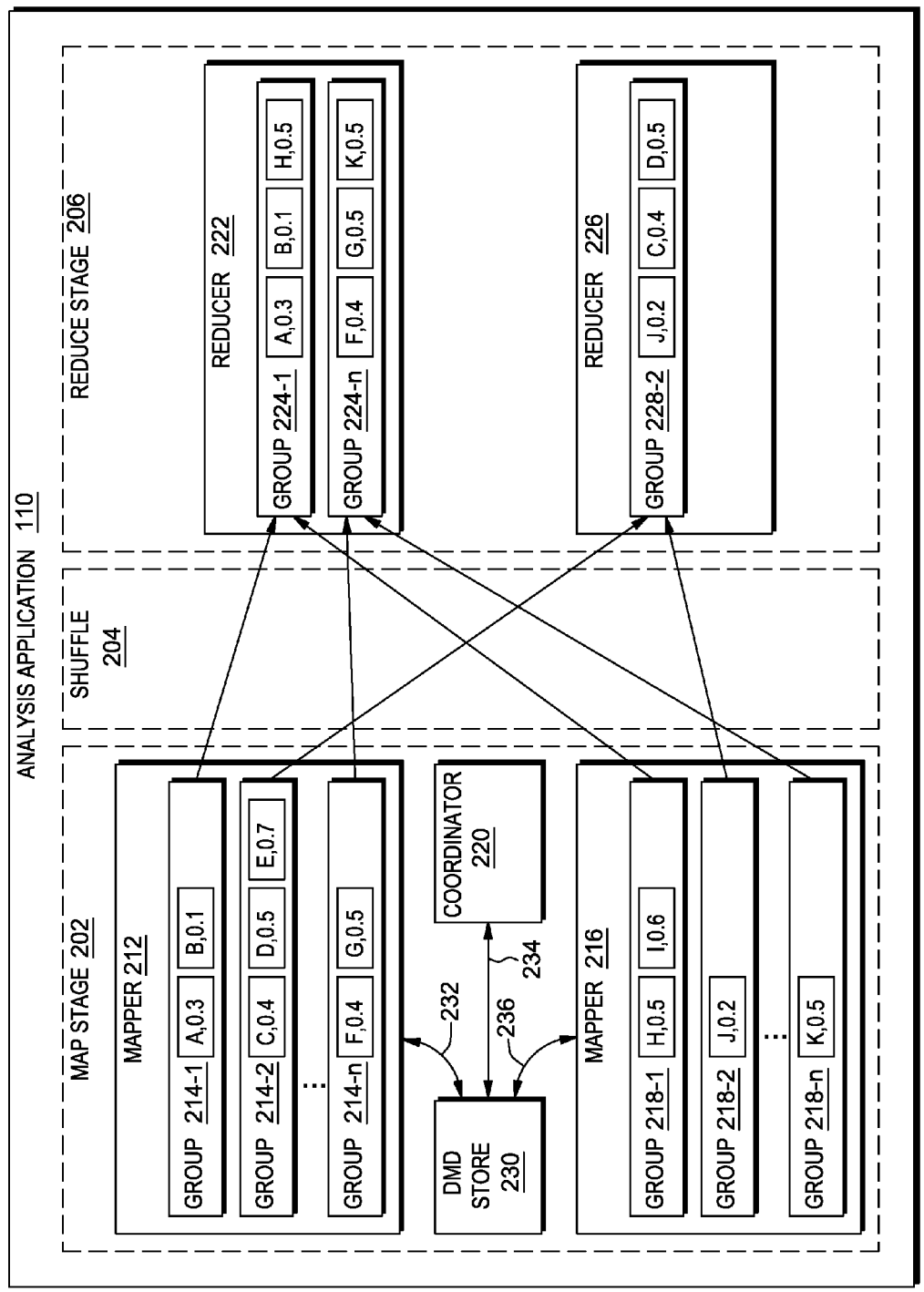
FIG. 2 is a block diagram of an analysis application of the enterprise data environment of FIG. 1 in accordance with an embodiment of the present invention.

Referring now to FIG. 2, a block diagram of analysis application 110 in accordance with an embodiment of the present invention is shown. Analysis application 110 includes mappers 212 and 216, reducers 222 and 226, coordinator 220, and distributed meta-data (DMD) store 230. FIG. 2 also depicts three operational phases: map stage 202, shuffle 204, and reduce stage 206. It should be understood that map stage 202, shuffle 204, and reduce stage 206 are operational phases performed during the operation of analysis application 110, rather than components or subprograms of analysis application 110. During the following discussion of FIG. 2, several aspects of the depictions of mappers 212 and 216 and reducers 222 and 226 will be discussed, and then a chronological discussion of map stage 202, shuffle 204, and reduce stage 206 will be had.

Depicted in each of mappers 212 and 216 and reducers 222 and 226 are several weighted records, separated into groups. For example, within mapper 212 is record A in group 214-1. Notably, record A is also depicted in group 224-1 of reducer 222. As such, it should be understood that analysis application 110 transfers record A from mapper 212 to reducer 222 during shuffle 204, as discussed below. Each record depicted in FIG. 2 includes a uniform random weight between 0.0 and 1.0. For example, record A includes the weight 0.3, and record B includes the weight 0.1. Although all depicted weights have a precision of one digit, it should be understood that in various embodiments weights can have arbitrary precision, i.e., can have more digits. In one embodiment, analysis application 110 assigns a weight to each record during operation just prior to map stage 202, while in another embodiment records are assigned a weight when initially stored in data store 112, prior to operation of analysis application 110. The use of the weights will also be discussed below.

Mapper 212 includes n groups, of which only groups 214-1, 214-2, and 214-n are shown. Similarly, mapper 216 also includes n groups, of which only groups 218-1, 218-2, and 218-n are shown. Groups having a number between 3 and n−1 are omitted for clarity. It should be understood that n can be any integer, and that the number n corresponds to the number of strata that are being sampled by analysis application 110. As such, each group corresponds to a stratum of the data in data store 112. For example, if data store 112 includes credit card transaction data, then groups 214-1 and 218-1 can include credit card transactions not marked as fraudulent (e.g., record A and record H, etc.), while groups 214-2 and 218-2 can include credit card transactions that are marked as fraudulent (e.g., record C and record J, etc.). Further groups between 3 and n can include other types of data (e.g., group n can include credit card transactions that are marked as suspicious, but not definitively fraudulent or non-fraudulent, etc.).

Reducer 222 includes 2 groups, while reducer 226 includes 1 group, as shown. Reducer 222 includes records, depicted in group 224-1, received from groups 214-1 and 218-1 and additional records, depicted in group 224-n, received from groups 214-n and 218-n. Similarly, reducer 226 includes records, depicted in group 228-2, received from groups 214-2 and 218-2. Notably, not all records included in mappers 212 and 216 are also included in reducers 222 and 226 (e.g., record E is shown in mapper 212, but not in reducer 226, etc.) These are not omissions for clarity; instead, such omissions occur because the omitted records are false positive records that are not filtered during map stage 202, but that are filtered during reduce stage 206, as discussed below. It should be understood that records in groups having a number between 3 and n−1 may be received by reducer 222, reducer 226, or additional reducers not shown for clarity. It should be further understood that additional mappers, not shown, may provide further grouped records to reducer 222, reducer 226, or additional reducers not shown.

Having discussed several aspects of the depictions of mappers 212 and 216 and reducers 222 and 226 above, a chronological discussion of map stage 202, shuffle 204, and reduce stage 206 follows. Initially, analysis application 110 is invoked by enterprise application 108 on data in data store 112. Mappers 212 and 216 are applied in parallel on different partitions, or splits, of the data in data store 112 during map stage 202. Each of mappers 212 and 216 iterates over all the input (key, value) pairs in a split, applying a map function to assign each record in the split to a group, or stratum. Accordingly, to process each record in the data store 112, each record appears in exactly one split, and each split includes a distinct portion of the data store 112 with no overlap. For example, mapper 212 assigns record A, not marked as fraudulent, to group 214-1, and record C, marked as fraudulent, to group 214-2. By this mapping, every record in data store 112 is assigned to a stratum by a mapper.

While mappers 212 and 216 are assigning records to groups during map stage 202, records having weights greater than the local threshold of a group in a given mapper are immediately discarded, so that no individual mapper has more than k records, the desired sample size. Further, each of mappers 212 and 216 as well as coordinator 220 communicate through DMD store 230 to monotonically reduce local thresholds, in order to keep the total number of records per group in all mappers close to k. For example, at k equal to 3, it should be noted that groups 214-1 and 218-1 include only 4 total records, groups 214-2 and 218-2 include only 4 total records, and groups 214-n and 218-n include only 3 total records. To communicate, mappers 212 and 216 propose thresholds (i.e., their local thresholds) to coordinator 220, and coordinator 220 picks the best proposed threshold (i.e., a new global threshold per group) for which it can prove that mappers 212 and 216 all together will have at least k records, based on the current state of the group in DMD store 230. As such, each of mappers 212 and 216 can contribute proposal thresholds and candidate counts at its local speed, and coordinator 220 produces a best threshold based on the latest available information, which is not required to be completely up-to-date.

Notably, each of mappers 212 and 216 has its own view of the global threshold per group, which could be "outdated," i.e., out of sync with DMD store 230. Generally, a global threshold of the i-th group is the k-th smallest weight associated with records in the i-th group, denoted by $w_{i;(k)}$. Coordinator 220, mappers 212 and 216, and reducers 222 and 226 can have different views about a group's threshold. Each of mappers 212 and 216 only sees a subset of records, and computes a local threshold, whereas reducers 222 and 226 see all the weights that can affect the threshold, and so they arrive at a global threshold per group.

Mappers 212 and 216 as well as coordinator 220 use a fully asynchronous coordination protocol that relies on DMD store 230, which mappers 212 and 216 and coordinator 220 are able to read and write asynchronously. According to the asynchronous coordination protocol, if coordination or communication of thresholds falls behind, each of mappers 212 and 216 can still make progress by filtering records with the last version of the threshold received from coordinator 220. In one embodiment, DMD store 230 has a hierarchical data model and stores a small amount of coordination state per group. The fully asynchronous coordination protocol is illustrated in transaction groups 232, 234, and 236. Details of the asynchronous coordination protocol are discussed in the context of FIG. 3, below.

Having iterated over all the input (key, value) pairs in a split to assign each record in the split to a group during map stage 202, mappers 212 and 216 conclude, and analysis application 110 shuffles the resulting groups to reducers 222 and 226 during shuffle 204. Notably, because mappers 212 and 216 have coordinated to filter records having weights in excess of a threshold from the groups during map stage 202, the total amount of shuffle bandwidth consumed during shuffle 204 is markedly reduced, specifically, the reduction in shuffle bandwidth can be attributed to the reduction in data volume of the group by a factor of the number of mappers, as a consequence of the aforementioned coordinated filtering of the mappers.

After shuffle 204, during reduce stage 206 reducers 222 and 226 filter any false-positive records that were not filtered during preceding map stage 202. For example, reducer 222 receives records A, B, H, and I from groups 214-1 and 218-1. Record I, having a weight of 0.6 that is higher than the weights of records A, B, and H, is filtered from group 224-1, so that the resulting group 224-1 has a size of exactly k (i.e., exactly 3, in this example). For another example, reducer 226 receives records C, D, E, and J from groups 214-2 and 218-2. Record E, having a weight of 0.7 that is higher than the weights of records C, D, and J, is filtered from group 228-2, so that the resulting group 228-2 has a size of exactly k (again, exactly 3, in this example). Consequently, the output of analysis application 110 after reduce stage 206 are groups, or strata, of records of sample size exactly k.

Figure 3:
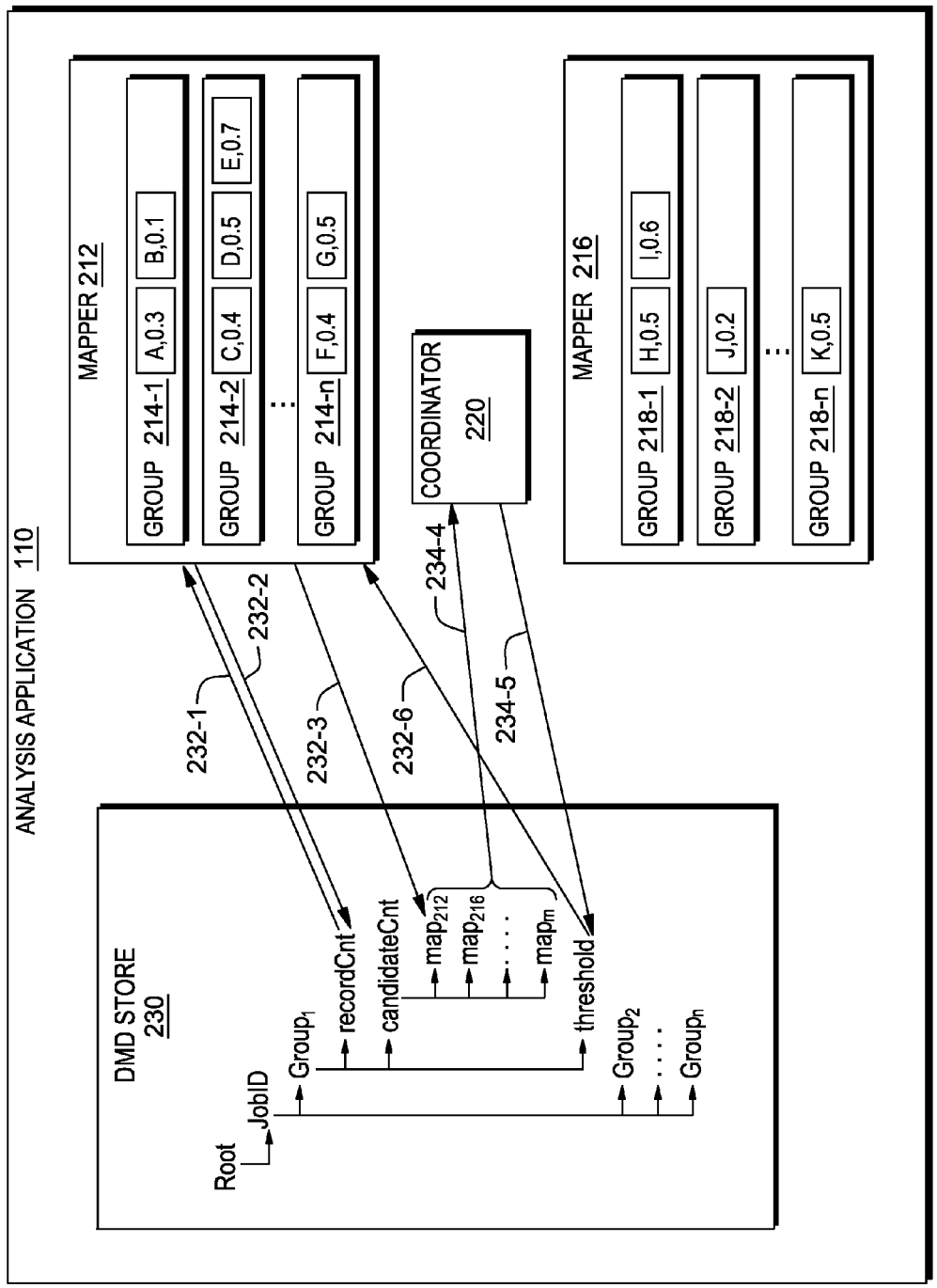
FIG. 3 is a block diagram of an analysis application of the enterprise data environment of FIG. 1 in accordance with an embodiment of the present invention.

Referring now to FIG. 3, a block diagram of analysis application 110 in accordance with an embodiment of the present invention is shown. Aspects of analysis application 110 shown in FIG. 2 related to shuffle 204 and reduce stage 206 are omitted for clarity, such that in FIG. 3 analysis application 110 is shown to include mapper 212, mapper 216, coordinator 220, DMD store 230, and several transactions of transaction groups 232 and 234. Transaction group 236 is also omitted for clarity.

DMD store 230 performs efficient distributed read and writes of small amounts of data in a transactional manner. In one embodiment, DMD store 230 is highly available and fault tolerant. Data is organized in DMD store 230 in a hierarchical structure of jobs and groups, as shown. In particular, each job can be represented with a JobID, and can include a single stratified sampling request. As such, one job might be dedicated to performing stratified sampling of the fraudulent, non-fraudulent, and suspicious credit card transactions in data store 112, while another job might be dedicated to a different stratified sampling task (e.g., stratified sampling of all of the credit card transactions larger than $1,000 in data store 112, etc.). Each job in DMD store 230 includes a group for each stratum. As such, Group$_1$ of DMD store 230 corresponds to the stratum of groups 214-1 and 218-1, for example. Similarly, Group$_2$ through Group$_n$, shown hierarchically collapsed for clarity, correspond to the strata of groups 214-2 and 218-2 through groups 214-$n$ and 218-$n$. Each group of a job includes a record count (i.e., "recordCnt"), a set of candidate counts per mapper (i.e., "candidateCnt" having counts "map$_{212}$" through "map$_m$"), and a group threshold (i.e., "threshold").

Distributed reads and writes are performed on DMD store 230 during the various transactions of transaction groups 232 and 234, as summarized in the following asynchronous coordination protocol listing 1 (in which DMD store 230 is written as "DMDS"):

Listing 1

| | |
|---|---|
| 232-1: | Mapper j reads the current record count N$_i$ for group i, from location Group$_i$/recordCnt in DMDS. |
| 232-2: | Mapper j adds the number of records it has scanned since its last update for the i-th group, n$_{j,i}$, to N$_i$ and writes it back to DMDS. |
| 232-3: | Mapper j counts the number of samples it has with weight w ≤ t$_{j,i}$ = k/N$_i$, denoted by s$_{j,i}$, and writes the threshold proposal and count pair (t$_{j,i}$, s$_{j,i}$) to location Group$_i$/candidateCnt/map$_j$ in DMDS. |
| 234-4: | The coordinator reads all the threshold proposal and count pairs for group i and tries to compute a new threshold. |
| 234-5: | If the coordinator computes a better threshold for the i-th group, it writes it to Group$_i$/threshold in DMDS. |
| 232-6: | Mappers update their local thresholds with the most recent threshold from DMDS and start using it to filter local sample. |

In particular, during map stage 202, mappers 212 and 216 maintain local samples of records for each group as they read and partition input data from data store 212 (e.g., mapper 212 maintains the local sample records A and B in group 214-1, etc.). After each mapper has read a certain number of new records for a group, it initiates a new round of communication with DMD store 230 in the asynchronous coordination protocol, to update the group's record count. For example, after mapper 212 has read 10 new records for group 214-1, mapper 212 reads the Group$_1$ record count of 100 in transaction 232-1, adds the number of new records, 10, to the record count, and writes the sum 110 back to the same location in transaction 232-2. Notably, each group's record count is the only location where multiple mappers write to the same location in DMD store 230 during the asynchronous coordination protocol. As such, during the various transactions of transaction group 236 (not shown in FIG. 3), mapper 216 also reads and writes to the Group$_1$ record count. After updating the group record count, each mapper counts the number of samples it has with weight w≤t$_{j,i}$=k/N$_i$ and writes the count and the proposed threshold to its respective candidate count. For example, in transaction 232-3 mapper 212 writes a count and a new proposed threshold to its candidate count map$_{212}$.

Following transactions 232-1, 232-2, and 232-3 performed by mapper 212, coordinator 220 performs several transactions of transaction group 234. Pseudocode for coordinator 220 is given in the following algorithm 1:

Algorithm 1

```
1:   while (!allDone) do
2:       for each group i to be coordinated do
3:           for each map j's msg for group i in DMDS do
4:               if there is a previous proposal from j then
5:                   list[i].removeOld(j)
6:               end if
7:               list[i].addNew(j)
8:           end for
9:           thre ← list[i].findThreshold( )
10:          if thre < lastThre[i] then
11:              updateThre(i, thre)
12:          end if
13:      end for
14:  end while
```

In particular, coordinator 220 collects threshold proposals t$_{j,i}$ and respective candidate counts s$_{j,i}$ in transaction 234-4. For each group i, coordinator 220 maintains a list of triplets <t$_{j,i}$; s$_{j,i}$; j> by removing the previous proposal from the same mapper if one existed (Algorithm 1, lines 4-6), and adding the new proposal to the list (Algorithm 1, line 7). Coordinator 220 keeps the proposal list sorted in the increasing order of thresholds, to facilitate the subsequent findThreshold( ) operation in line 9. The findThreshold( ) operation finds the smallest threshold proposal that guarantees a sample of size k, by scanning the list from the head and computing S$_i$, a running sum of sample counts s$_{j,i}$. Coordinator 220 stops scanning the list once S$_i$≥k; all triplets after this point in the list are removed and the t$_{j,i}$ in the last triplet is the threshold to be returned. If the findThreshold( ) operation is successful and the resulting threshold is not the same as the last one, coordinator 220 updates the group threshold in DMD store 230 during transaction 234-5. However, if S$_i$ never reaches k, the group threshold is not updated, and coordinator 220 will attempt to coordinate the group again during a following pass. Notably, coordinator 220 will post a group threshold in DMD store 230 only if it has guarantees from the mappers that they already have at least k samples for this threshold. Until coordinator 220 can prove this, mappers will use their local thresholds to filter samples.

Following transactions 234-4 and 234-5 performed by coordinator 220, mapper 212 performs transaction 232-6. In transaction 232-6, mapper 212 updates its local threshold with the most recent threshold from DMD store 230 written by coordinator 220 in transaction 234-5, and starts using the updated local threshold to filter local samples.

In one embodiment, a mapper can send multiple threshold proposals during a single transaction 232-3. In particular, when a mapper gets the total number of records that have been scanned for a particular group from DMD store 230 during transaction 232-1, the information may already be outdated to some extent, depending on the network delay and the scanning speed of all mappers. The threshold proposal generated by mapper 212 based on this outdated total count tends to be conservative, i.e., an overestimate of what it should have been with the real current record count. Furthermore, once a proposal t has been submitted, coordinator 220 will use it until mapper 212 submits a new proposal. During this interval, as other mappers submit proposals based on the increasing record count, t will become less and less relevant. Considering this, mapper 212 can send a more optimistic threshold proposal and corresponding candidate count in transaction 232-3. Mapper 212 can generate an optimistic threshold proposal assuming that the record count will go up by some percentage p, and propose a threshold $t_p=k/N_t/(1+p)$. In practice, mappers can generate multiple threshold proposals simultaneously and write them in a single message, with minimal overhead.

In one embodiment, DMD store 230 can be implemented on top of Apache ZooKeeper, to satisfy requirements for performance, functionality, fault tolerance, and high availability. Of course, many other tools could also be used to implement DMD store 230. Since ZooKeeper cannot execute user code, coordinator 220 can be executed outside of DMD store 230. To prevent coordinator 220 from becoming a bottleneck, especially when the number of groups to be coordinated is large, the coordination process can be distributed by partitioning the groups and dynamically assigning them to multiple, different coordinators. For example, a separate coordinator thread (i.e., a separate coordinator 220 executing in a thread) can be implemented in every map task of the Hadoop jobs of analysis application 110. Every map task can also run a ZooKeeper client thread to handle asynchronous communication with DMD store 230, and to handle pushing threshold updates from DMD store 230 to every mapper.

Figure 4:
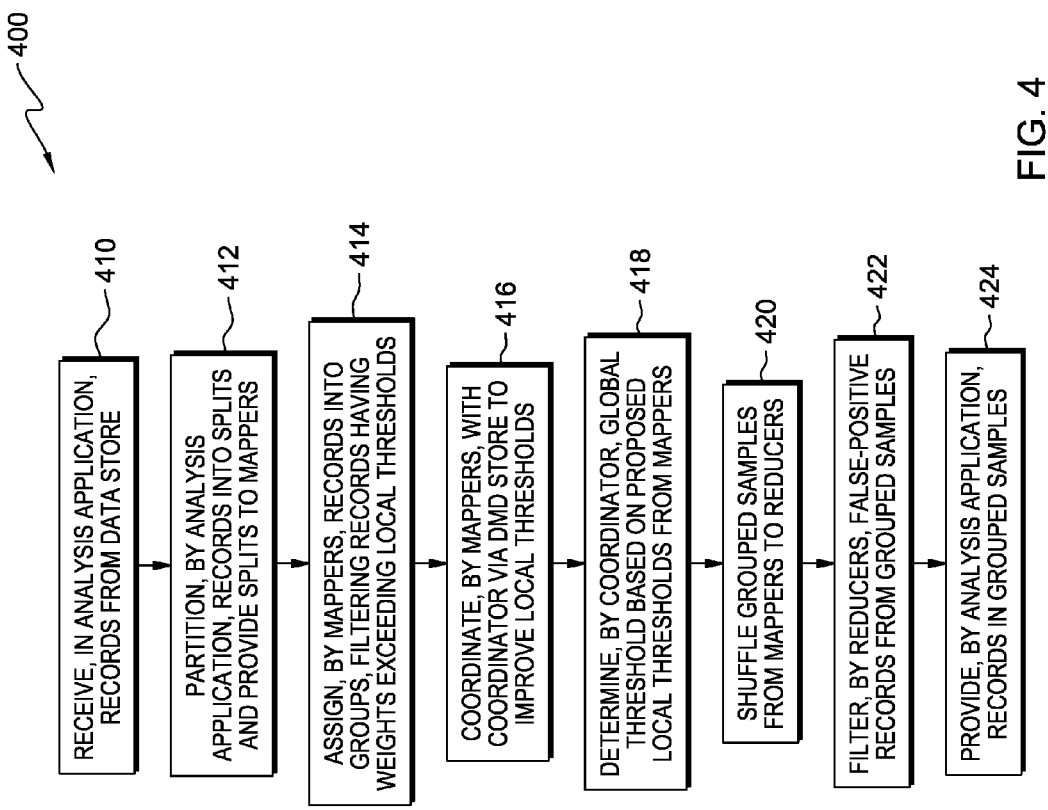
FIG. 4 is a flowchart depicting steps followed by an analysis application of the enterprise data environment of FIG. 1 in accordance with an embodiment of the present invention.

Referring now to FIG. 4, flowchart 400 depicting steps followed by analysis application 110 in accordance with an embodiment of the present invention is shown. In step 410, analysis application 110 receives records from data store 112. In step 412, analysis application 110 partitions the records into splits and provides the splits to mappers (e.g., to mappers 212 and 216, etc.). In step 414, each mapper assigns its records into groups (i.e., strata), while filtering records having weights exceeding the mapper's local threshold. In step 416, the mappers coordinate with a coordinator (e.g., coordinator 220, etc.) via DMD store 230 to improve their local threshold (e.g., transaction groups 232 and 236, etc.). In step 418, the coordinator determines a global threshold per group based on proposed local thresholds from mappers (e.g., transaction group 234, etc.). In step 420, grouped samples are shuffled from mappers to reducers (e.g., to reducers 222 and 226, etc.). In step 422, the reducers filter false-positive records from the grouped samples. In step 424, analysis application 110 provides records in grouped samples (e.g., to enterprise application 108, which originally invoked analysis application 110, etc.).

Figure 5:
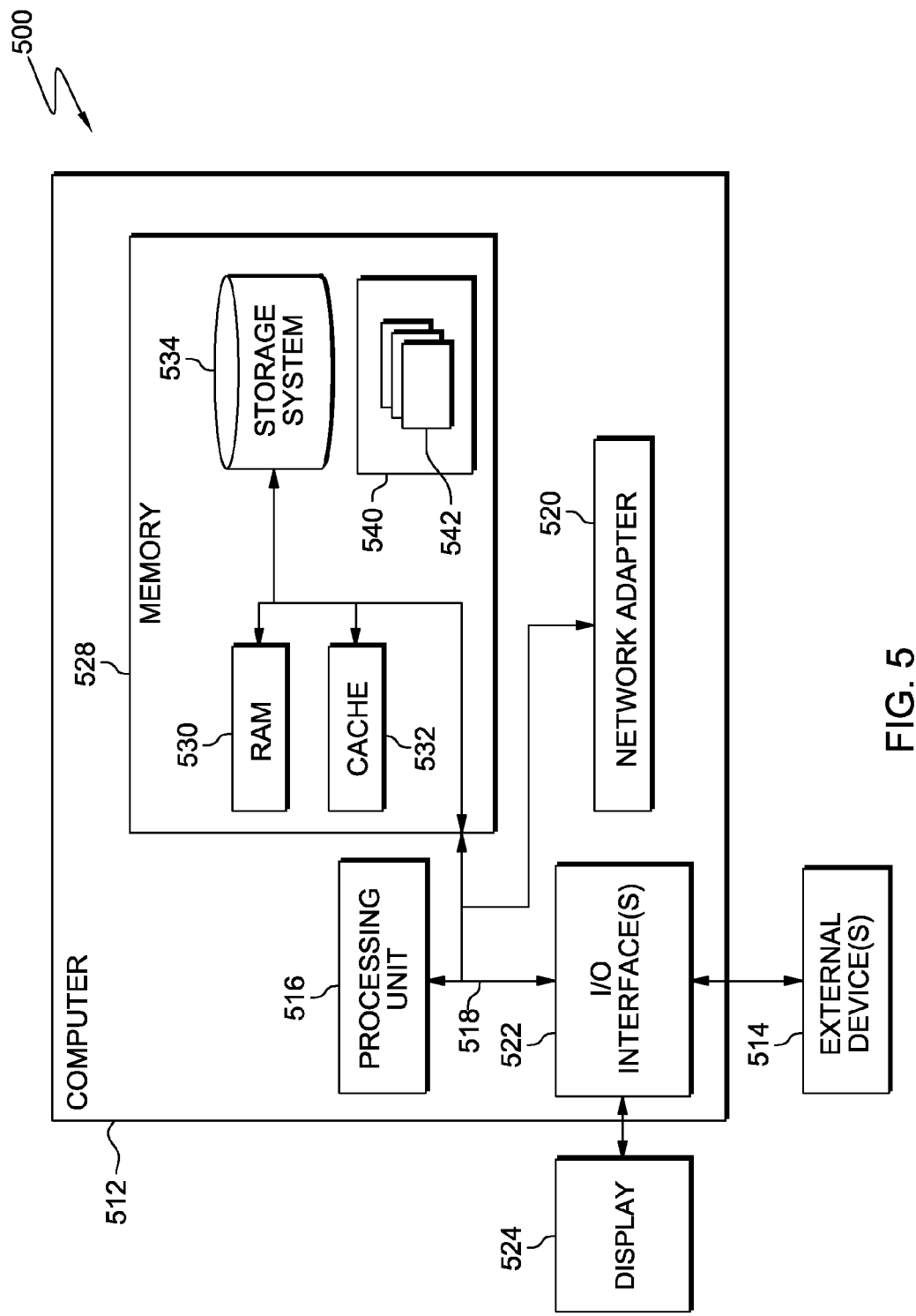
FIG. 5 is a block diagram of a computer system in accordance with an embodiment of the present invention.

Referring now to FIG. 5, a block diagram of a computer system in accordance with an embodiment of the present invention is shown. Computer system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove.

In computer system 500 there is computer 512, which is operational with numerous other general purpose or special purpose computing system environments or configurations. Examples of well-known computing systems, environments, and/or configurations that may be suitable for use with computer 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Each one of data sources 104, as well as enterprise system 106, can include or can be implemented as an instance of computer 512.

Computer 512 may be described in the general context of computer system executable instructions, such as program modules, being executed by a computer system. Generally, program modules may include routines, programs, objects, components, logic, data structures, and so on that perform particular tasks or implement particular abstract data types. Computer 512 may be practiced in distributed cloud computing environments where tasks are performed by remote processing devices that are linked through a communications network. In a distributed cloud computing environment, program modules may be located in both local and remote computer system storage media including memory storage devices.

As further shown in FIG. 5, computer 512 in computer system 500 is shown in the form of a general-purpose computing device. The components of computer 512 may include, but are not limited to, one or more processors or processing units 516, memory 528, and bus 518 that couples various system components including memory 528 to processing unit 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 512 typically includes a variety of computer system readable media. Such media may be any available media that is accessible by computer 512, and includes both volatile and non-volatile media, and removable and non-removable media. Data store 112 can be stored on such media.

Memory 528 can include computer system readable media in the form of volatile memory, such as random access memory (RAM) 530 and/or cache 532. Computer 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program 540, having one or more program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Enterprise application 108 and analysis application 110 can be implemented as or can be an instance of program 540.

Computer 512 may also communicate with one or more external devices 514 such as a keyboard, a pointing device, or one or more devices that enable a user to interact with computer 512, such as via display 524; and/or any devices (e.g., network card, modem, etc.) that enable computer 512 to communicate with one or more other computing devices. Such communication can occur via Input/Output (I/O) interfaces 522. Still yet, computer 512 can communicate with one or more networks such as a local area network (LAN), a general wide area network (WAN), and/or a public network (e.g., the Internet) via network adapter 520. As depicted, network adapter 520 communicates with the other components of computer 512 via bus 518. It should be understood that although not shown, other hardware and/or software components could be used in conjunction with computer 512. Examples, include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java (note: the term(s) Java may be subject to trademark and/or service mark rights in various jurisdictions throughout the world, and, to that extent, references to this term(s) herein are to be taken to exclusively apply only to legitimate products of the trademark/service mark owner(s)), Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor (i.e., a computing processor) of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for stratified sampling of a plurality of records, the method comprising:
   partitioning a plurality of records into a plurality of splits, wherein each split includes at least a portion of the plurality of records;
   providing at least one split of the plurality of splits to a mapper;
   assigning at least a portion the records of the at least one split to a group, wherein each assignment to the group is based on a strata of the assigned record;
   filtering the records of the group, wherein each filtering is based on a comparison of a weight of a record to a local threshold of the mapper;
   shuffling the group to a reducer; and
   providing a stratified sampling of the plurality of records based on the group.

2. A system for stratified sampling of a plurality of records, the system comprising:
   a memory having computer readable computer instructions; and
   a processor for executing the computer readable computer instructions, the instructions executable by the processor to, in a mapreduce framework:
   identify a dataset, wherein the dataset is stratified such that one or more strata exist with the dataset, based on shared properties of records within the dataset;
   partition the dataset into a plurality of splits, wherein each split comprises one or more records of the dataset such that each record appears in only one split;
   provide at least one split of the plurality of splits to a mapper;
   assign, by the mapper, at least a portion the records of the at least one split to a group, wherein each assignment to the group is based on a stratum of the one or more strata to which the assigned record belongs;
   assign each record a random weight according to a uniform distribution;
   filter, by the mapper, the records of the group, by retaining only those records for which the weight is less than a local threshold;
   shuffle the group from the mapper to a reducer; and
   provide a stratified sampling of the dataset based on the stratum.

3. The method of claim 1, further comprising assigning a weight to each record of the plurality of records, wherein each assigned weight is a uniform random weight.

4. The method of claim 1, further comprising filtering the records of the group in the reducer, wherein each filtering is based on the weight of a record.

5. The method of claim 1, further comprising updating the local threshold of the mapper by receiving a group threshold from a coordinator.

6. The method of claim 1, further comprising updating the group threshold of a coordinator.

7. The method of claim 1, further comprising receiving a plurality of local thresholds including the local threshold of the mapper from a respective plurality of mappers including the mapper.

8. The method of claim 1, wherein assigning at least a portion the records of the at least one split to a group comprises discarding records having weights greater than the local threshold of the group.

9. The method of claim 1, wherein the mapper exchanges information with at least one other mapper through an asynchronous communication channel, the asynchronous communication channel being implemented with a distributed meta-data store.

10. The method of claim 1, further comprising assigning a weight to each record of the plurality of records, wherein each assigned weight is the value of a function computed over each record, and wherein the global distribution of the values is approximated by a histogram.

11. The method of claim 1, further comprising:
    receiving transaction data through a network from one or more data sources; and
    converting the received transaction data into the plurality of records.

12. The system of claim 2, the instructions further executable to update the group threshold of a coordinator.

13. The method of claim 6, wherein the updating the group threshold of the coordinator includes transmitting the local threshold to the coordinator.

14. The computer-implemented method of claim 9, wherein the distributed metadata store is such that each mapper is aware of the global state of a job, wherein the job is for processing at least a portion of the plurality of records.

15. The method of claim 11, wherein the one or more data sources includes one or more cloud computing datacenters that are electronically connected to one or more mobile devices.

16. The method of claim 13, further comprising sub-sampling local reservoir samples, by the coordinator according to a multivariate hypergeometric distribution, based on the local threshold.

17. The method of claim 15, wherein the plurality of records is organized in a metadata store according to a likelihood of any given transaction being a fraudulent transaction.

18. The system of claim 12, wherein the updating the group threshold of the coordinator includes transmitting the local threshold to the coordinator.

19. The method of claim 16, wherein each group comprises a number of the records equal to a required sample size for the strata of the group.

20. The method of claim 16, wherein the at least one split comprises a large number of small groups; and wherein the multivariate hypergeometric distribution is not sampled for the small groups.

21. The method of claim 17, further comprising:
    providing a second mapper; wherein the mapper and the second mapper may communicate through an asynchronous communication channel implemented by the metadata store;
    collecting, by the mapper and the second mapper, the plurality of records by assigning records from one or more strata to the plurality of records;
    reducing, by the mapper and the second mapper, the data volume of the plurality of records by a factor of the number of the mapper and the second mapper by randomly selecting records from the plurality of records up to a predetermined threshold at each mapper;

updating the plurality of records by periodically updating a distributed metadata store; and shuffling at least one remaining record of the plurality of records from the mapper and the second mapper to at least one reducer.

* * * * *